United States Patent [19]
Alexander

[11] Patent Number: 5,832,554
[45] Date of Patent: Nov. 10, 1998

[54] DOCK LEVELER WITH CAM ASSISTED LIP EXTENSION

[75] Inventor: James C. Alexander, London, Canada

[73] Assignee: United Dominion Industries, Inc., Charlotte, N.C.

[21] Appl. No.: 802,430

[22] Filed: Feb. 18, 1997

[51] Int. Cl.[6] ....................................................... E01D 1/00
[52] U.S. Cl. ............................................. 14/71.1; 14/71.3
[58] Field of Search .................................. 14/69.5, 71.1, 14/71.3, 71.5, 71.7

[56] References Cited

U.S. PATENT DOCUMENTS

| | | | |
|---|---|---|---|
| Re. 30,104 | 10/1979 | Burnham | 14/71.3 |
| Re. 30,250 | 4/1980 | Catlett | 14/71.3 |
| 3,500,486 | 3/1970 | LeClear | 14/71.3 |
| 4,097,949 | 7/1978 | Barrett | 14/71.3 |
| 4,937,906 | 7/1990 | Alexander | 14/71.1 |
| 5,450,643 | 9/1995 | Warner | 14/71.3 X |
| 5,553,343 | 9/1996 | Alexander | 14/71.3 X |

*Primary Examiner*—Tamara L. Graysay
*Assistant Examiner*—Sunil Singh
*Attorney, Agent, or Firm*—Sughrue, Mion, Zinn, Macpeak & Seas, PLLC

[57] ABSTRACT

A dock leveler, typically powered by an electric actuator or other motive source has a frame and a deck pivotally mounted to the frame. The source of power to move the deck is coupled to the underside of the deck. An extendable lip is pivotally mounted to one end of the deck and an arm assembly is coupled at one end to the lip and at another end to a crank carried by the deck to utilize movement of the deck to raise said lip into an extended position. A cam-latch arm is resiliently coupled to the arm assembly and selectively bearing on the crank by means of a spring coupling to the arm assembly. A linkage is coupled between the frame and said cam-latch arm to urge said cam-latch arm into contact with the crank as the deck is raised. This tends to cause movement between the cam portion and a roller on the crank which in turn provides a component of force to assist in raising said lip into the extended position.

20 Claims, 6 Drawing Sheets

DOCK LEVELER WITH CAM ASSISTED LIP EXTENSION

BACKGROUND OF THE INVENTION

1. Field of the Invention

This invention relates to loading dock equipment and in particular to dock levelers using an electric actuator or hydraulic cylinder to move the dock leveler and having the lip extended by a mechanical linkage. This invention therefore has application with any dock leveler employing a mechanically extended lip.

2. Prior Art

Pit-style dock levelers are manufactured in a wide range of models to meet various requirements of price and performance. They can be divided into a number of different types as a function of the mode of power used to move the deck. Mechanical dock levelers are the most common because of their low cost. They are widely available and for reference purposes U.S. Pat. No. 3,997,932 illustrates one example of such a mechanical dock leveler.

This type of dock leveler employs different techniques of powering the device. Manual lift mechanical dock levelers are common and again, low cost devices. However, the operation requires the user bending over and lifting the unit. Another common type is the walk-down mechanical dock leveler. This requires less effort since the device is biased upward and the weight of the user "walks down" the device. However, the hold down requires maintenance and adjustment required to maintain accurate spring balance.

A second type is the hydraulic dock leveler which features ease of use but at higher cost due to the hydraulics which are employed as the mode of power. A variant is the hydraulic dock leveler with mechanical lip extension. This device has moderate cost when compared with an hydraulic dock leveler with hydraulic lip extension. The latter device provides better control of lip motion but at a higher cost compared with those having mechanical lip extension.

Another device is the electric dock leveler as disclosed in U.S. patent application Ser. No. 650,823, filed May 20, 1996, entitled "Electrically Actuated Dock Leveler", commonly assigned herewith and marketed by Serco as the model "EL" dock leveler. This device uses an electric actuator to raise the leveler and a mechanism to extend the lip.

One key element of the operation of a dock leveler, irrespective of the mode of power to move the deck, is the extension of the lip. On a fully hydraulic dock leveler the lip is extended by a hydraulic cylinder. On mechanical walkdown and manual lift levelers the lip is extended mechanically but much of the energy imparted to the lip is derived by raising the leveler rapidly. The lip is initially rotated by a mechanism aided by a spring counterbalance. However, the final portion of the extension relies on the momentum of the deck elevation and lip extension. An electrically assisted dock leveler or hydraulic leveler with mechanical lip is raised much more slowly and the lip does not have the momentum to extend.

FIGS. 7 and 8 illustrate a conventional lip mechanism with the lip chain assembly 75 fastened to a link plate 79 which is carried directly on pin 65. The chain spring assist mechanism is identical to that previously described. FIG. 7 shows that when the lip assembly 35 is pendant, the tensile force from the chain assembly 75 acting at the moment arm "d" provides a significant moment about the hinge pin 34 to urge the lip assembly 35 to rotate in a clockwise direction. The reference line for the moment arm is determined by the direction of the force on the chain 75. FIG. 8 shows that when the lip assembly is fully extended, the arm 38 has rotated so that the pin 65 is now in front of the hinge pin 34, i.e. to the left of pin 34, and the force of the chain acting at a negative distance "d" will urge the lip assembly 35 to rotate counterclockwise.

It is evident then that tension of the chain assembly 75 cannot cause the lip to fully extend. In the conventional mechanical dock leveler illustrated, the lip must be extended with sufficient speed so that rotational momentum generated during the first portion of rotation will cause the lip to continue to rotate clockwise even when the rotational moment of the chain force is reversed as the lip extends.

Within this technology there is a need for a more efficient lip assist mechanism that may be employed on a various dock levelers.

SUMMARY OF INVENTION

This invention is a mechanism which provides a positive lip extension for a dock leveler which is raised slowly, for example by an electrical actuator or hydraulic cylinder. It uses a cam to extend the lip and to latch it in the extended position. A mechanical spring is used to partially offset the weight of the lip and to reduce the force required by the electric actuator.

In accordance with this invention a dock leveler, typically powered by an electric actuator or other motive source has a frame and a deck pivotally mounted to the frame. The source of power to move the deck is coupled to the underside of the deck. An extendable lip is pivotally mounted to one end of the deck and a cam-latch arm is coupled at one end to the lip and selectively bearing on a roller by means of a spring to utilize movement of the deck to raise said lip into an extended position. A linkage is coupled between the frame and said cam-latch arm to urge said cam-latch arm into contact with the roller as the deck is raised. This tends to cause movement between the cam portion and the roller which in turn provides a component of force to assist in raising said lip into the extended position.

DESCRIPTION OF THE FIRST PREFERRED EMBODIMENT

Figure 1:
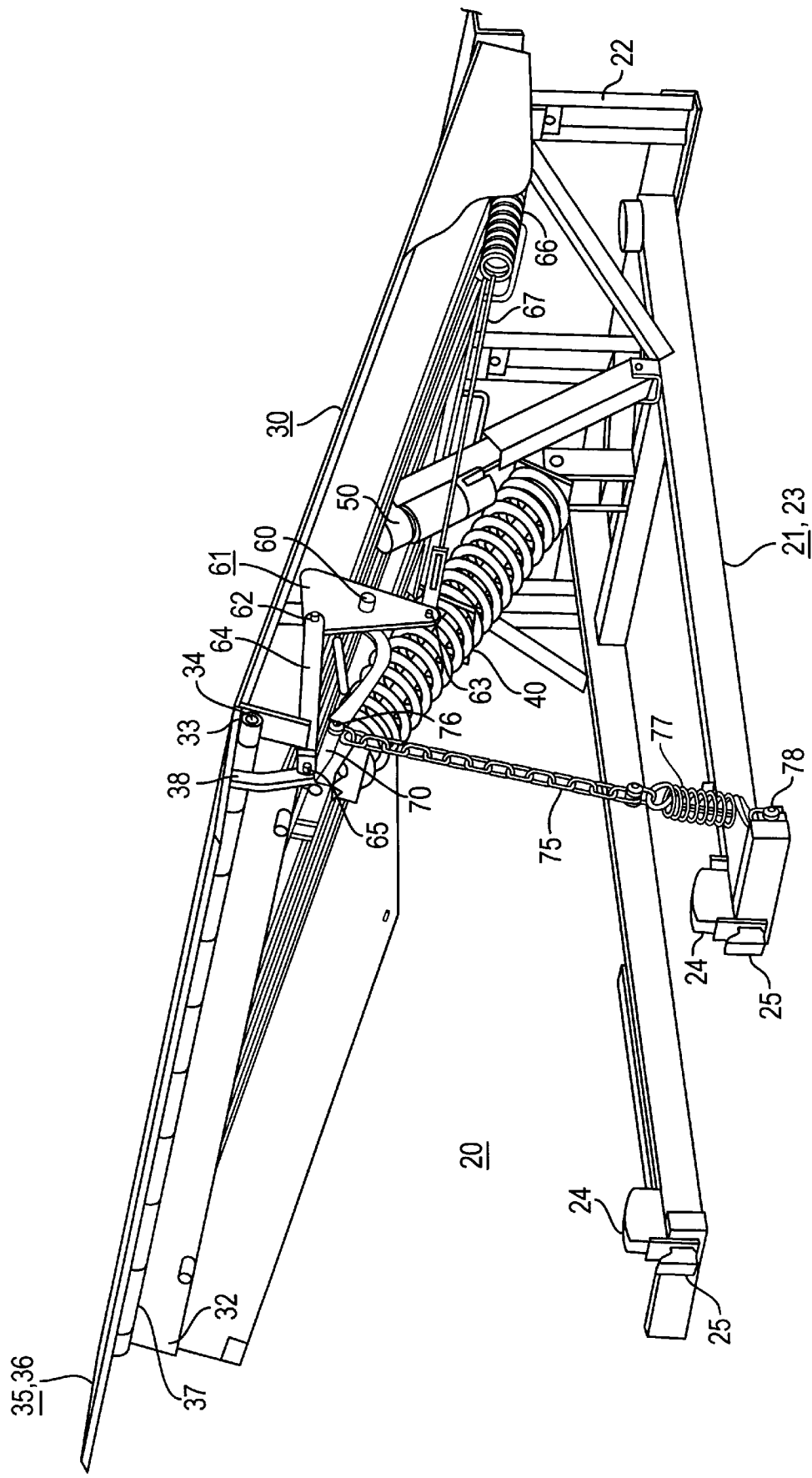
FIG. 1 is a perspective view of an electrically assisted dock leveler showing the essential components.

Referring now to FIG. 1, a first preferred embodiment of this invention will be described. An electrically assisted dock leveler 20 has a frame 21 including vertical back frame members 22. Horizontal frame members 23 extend forward to the front of the leveler and have ramp stops 24 and lip keepers 25. A deck 30 is attached to the top of the frame members 23 by a hinge pin, which is not shown. The front of the deck assembly has a front header bar 32 and hinge tubes 33. A lip assembly 35 has a lip 36, hinge tubes 37 and a lip arm 38, and is attached to the deck 30 by a hinge pin 34. The majority of the weight of the deck 30 is carried by the counterbalancing force of the spring assembly 40, and the actuator 50 is required to provide only the extra force to raise the deck 30 and extend the lip assembly 35. To the extent additional details are required as to these basic components of an electrically actuator, reference is made to U.S. patent application Ser. No. 650,823, filed May 20, 1996, entitled "Electrically Actuated Dock Leveler", commonly assigned and expressly incorporated herein by reference.

Figure 2:
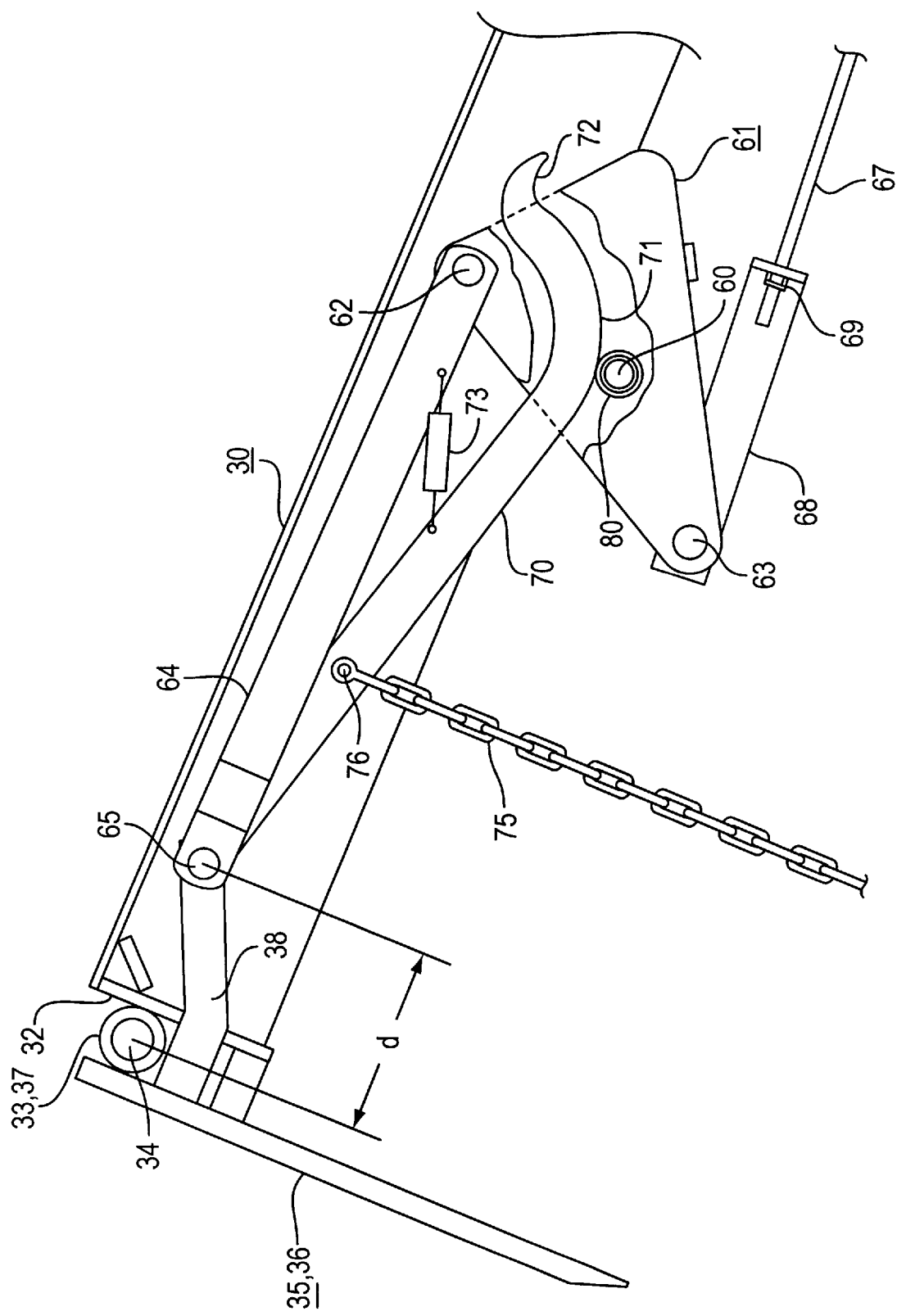
FIG. 2 is a partial side view of the mechanical lip extension of this invention used on an electrically assisted dock leveler with the lip pendant.

The lip assembly is partially counterbalanced by a spring mechanism. The spring cannot support the total weight of the lip assembly when extended or the lip will not fall to the pendant position for storage. Referring now to FIGS. 1 and 2, a shaft 60 attached to the deck 30 carries a crank assembly 61 which has pins 62 and 63. A lip bar 64 is carried at the rear by pin 62 and is attached to lip arm 38 by pin 65. A lip spring 66 has one end attached to the deck 30 and the other end to an adjusting rod 67 which in turn is attached to a bracket 68 by a nut 69. The rod end 68 is carried by pin 63 on the crank assembly 61, as shown in greater detail on FIG. 2. The lip spring 66 exerts a force which increases as deflection is increased and decreases when deflection is decreased. However, extension of the spring is decreased as the lip extends while the weight moment of the lip assembly 35 is greater when the lip is extended. The pins 62 and 63 are located on the crank assembly 61 such that as the force of the spring 66 decreases, the force exerted on the bar 64 increases relative to the spring force as the crank rotates and the lip extends.

A latch bar 70 is carried by pin 65 and has a curved cam-shaft surface 71 and a latch surface 72. A roller 80 rotates on shaft 60 to engage the cam surface 71, and a spring 73 is attached to the lip bar 64 and the latch bar 70 to bias the latch bar upward. A chain assembly 75 is attached at the top end to the latch bar 70 by a pin 76 and at the bottom end to a spring 77 which is attached to the frame 21 by a pin 78 to act as a resilient bias during the raising of the deck to position the lip, as will be described herein. As opposed to coupling the chain to the arm 38, as in the prior art, the chain in this invention is mounted to the latch bar 70. It will be appreciated that this change in mounting causes a rotational shift in the direction of the moment arm from pin 34, as will be described.

Figure 3:
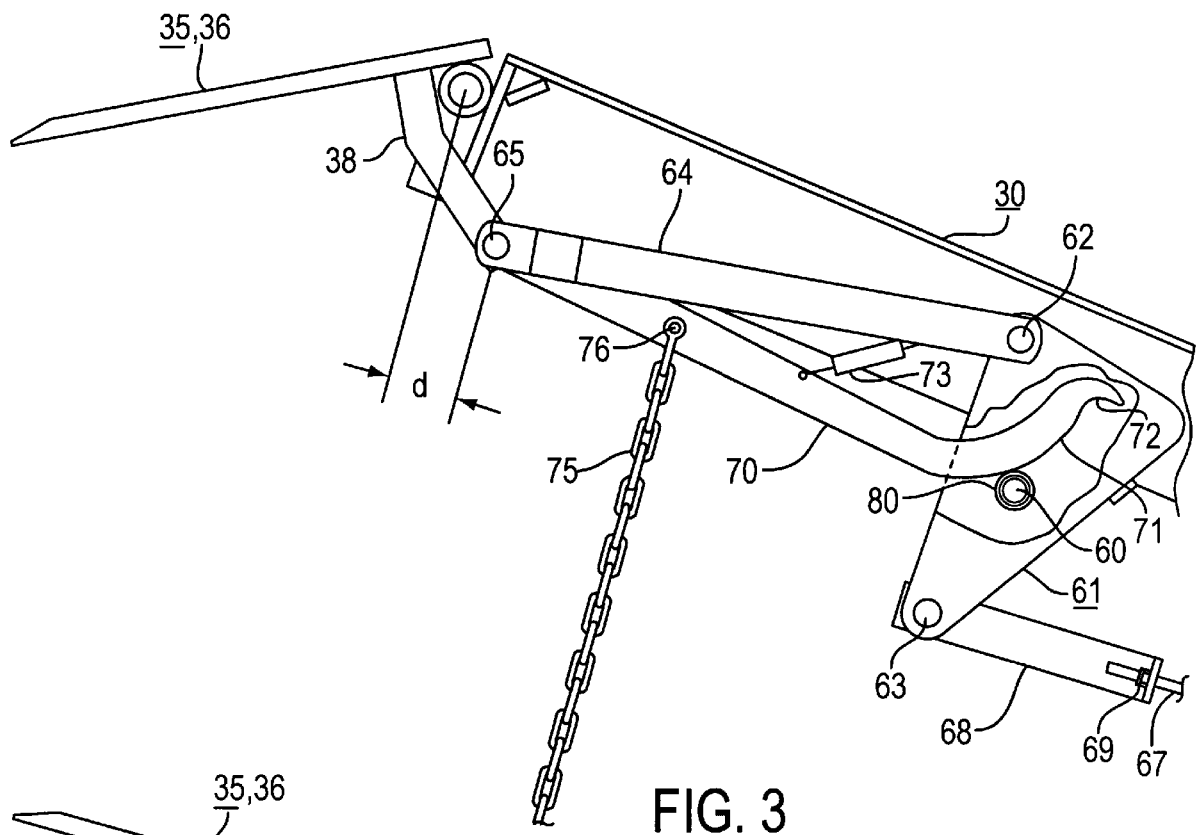
FIG. 3 is a partial side view illustrating the lip starting to extend.
Figure 4:
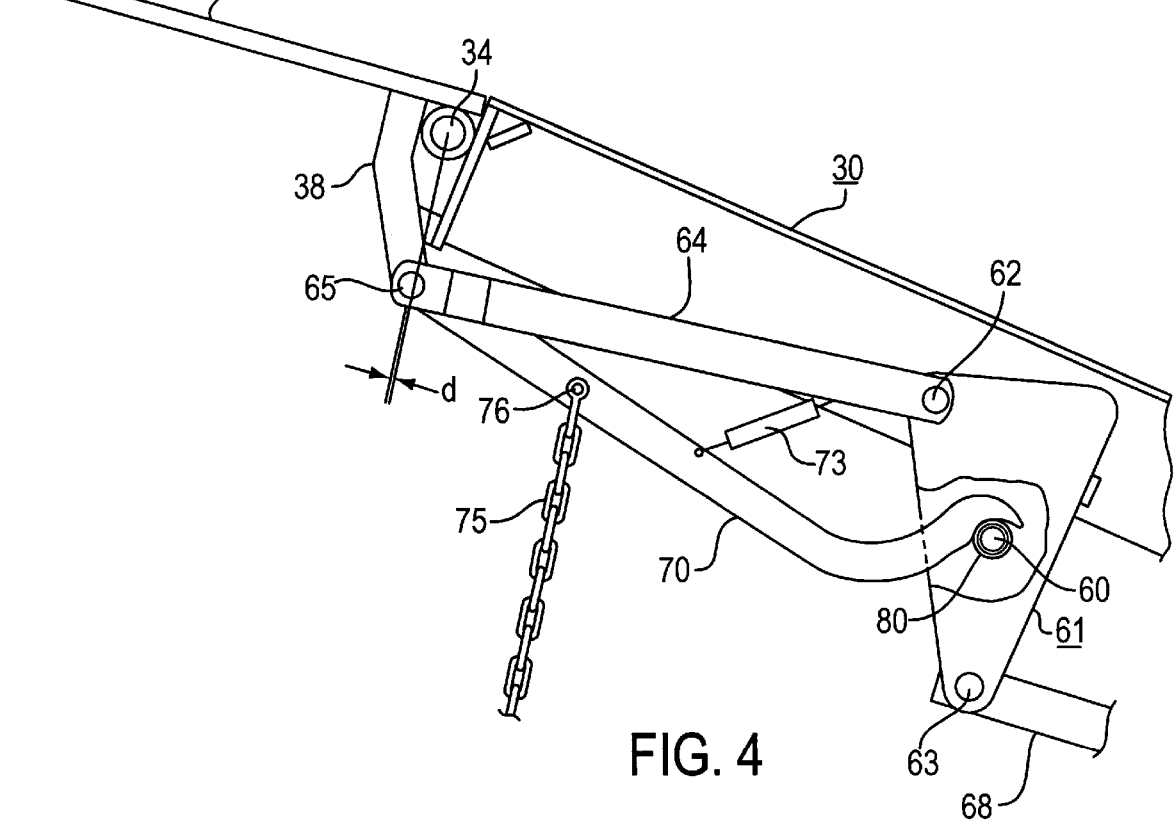
FIG. 4 is a partial side view illustrating the lip fully extended and latched.

The operation of this device will now be described. FIGS. 2, 3 and 4 illustrate the sequence of lip extension. In FIG. 2 the chain 75 pulls downward on the latch bar 70 which exerts a force on the pin 65 parallel to the line of chain assembly 75. The downward force on the pin 65 acts at a distance "d" from the lip hinge pin 34, which is the moment arm of the force on pin 65 relative to the lip hinge pin 34. This moment arm is perpendicular to the force applied by chain 75. The force on pin 65 acting at the distance "d" from the hinge pin 34 urges the lip assembly 35 to rotate clockwise. In FIG. 3 the lip assembly has rotated to a partially extended position and the latch bar 70 has moved forward so that cam surface 71 has moved downward on the roller 80. The downward force on pin 65 is now acting at a smaller distance "d" but the reaction of the cam surface 71 on the roller 80 causes a forward component of force which assists the rotation of the lip assembly 35. As the lip continues to rotate the distance "d" continues to decrease, even becoming slightly negative as shown in FIG. 4 when the pin 65 has moved to an over-travel position to the left of pin 34. However the slope of the cam surface 71 continues to increase, given its geometry, providing greater forward thrust to assist rotation of the lip assembly.

FIG. 4 illustrates the lip fully extended and the latch bar 70 pulled down until the latch surface 72 has engaged the roller 80. The weight of the lip assembly 35 forces the latch bar 70 against the roller 80 and the spring 73 is unable to lift the latch bar out of engagement with the roller. This is the fully extended position of the lip 35.

Figure 5:
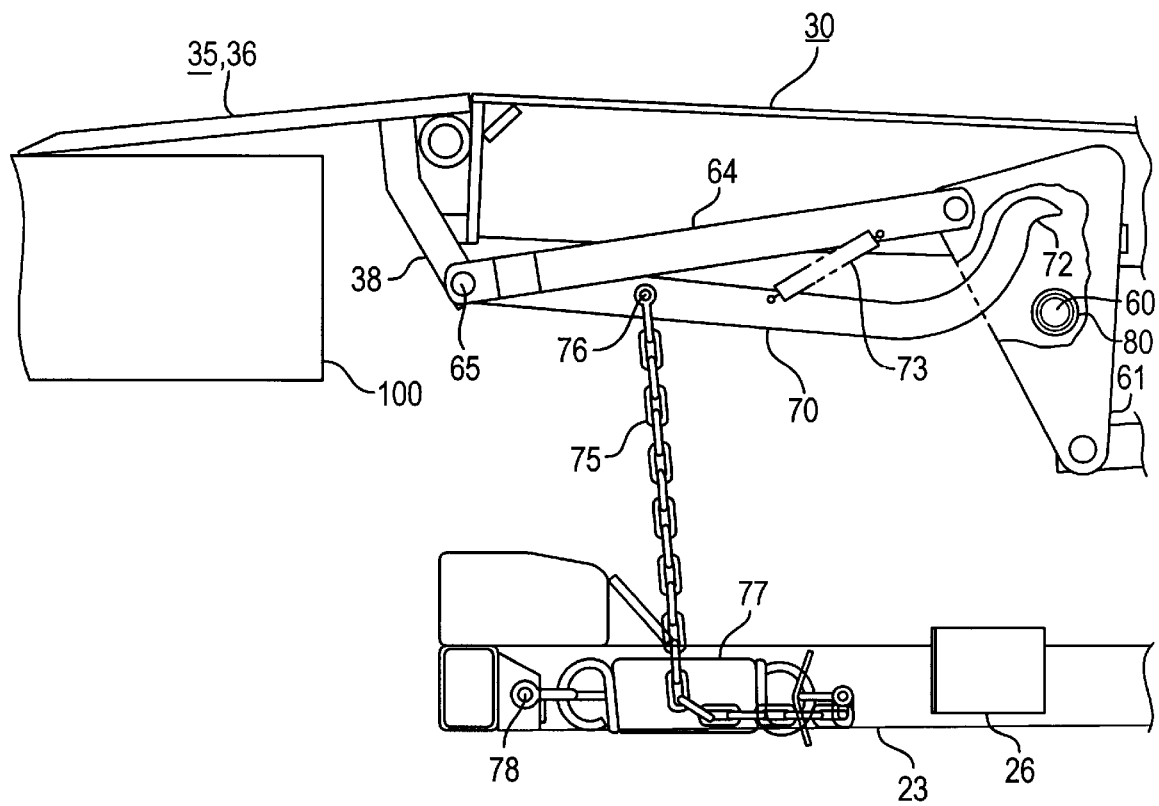
FIG. 5 is a partial side view illustrating the lip resting on a transport vehicle and the lip latch disengaged.

FIG. 5 illustrates the leveler with the lip 36 resting on a transport vehicle 100. The weight of the lip assembly is no longer carried by the latch bar 70 and the spring 73 has lifted the latch bar out of engagement with the roller 80. The chain assembly 75 is slack.

Figure 6:
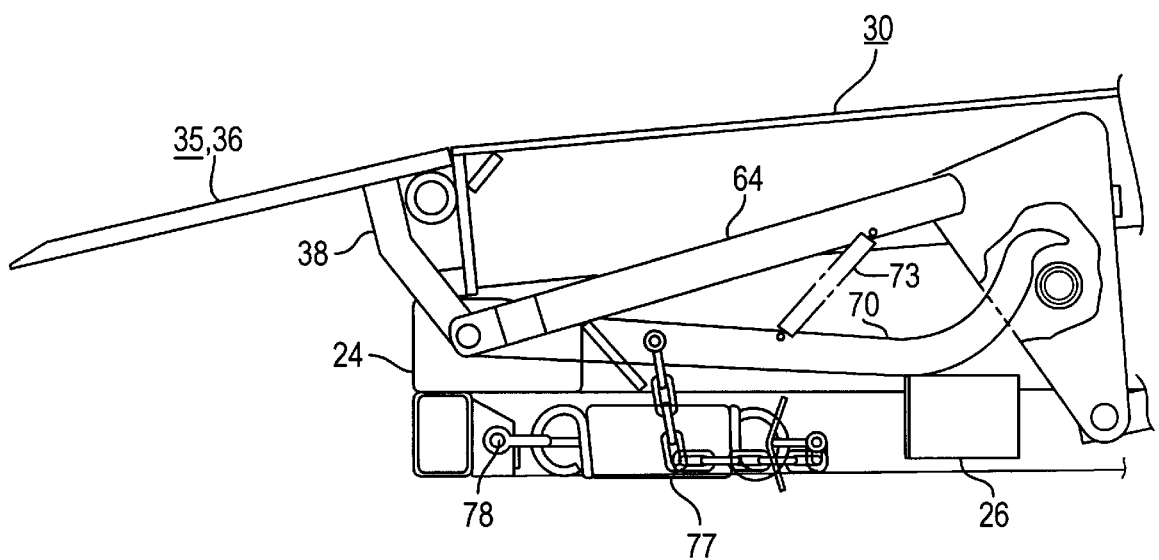
FIG. 6 is a partial side view illustrating the dock leveler fully lowered against the frame and the lip latch disengaged.
Figure 7:
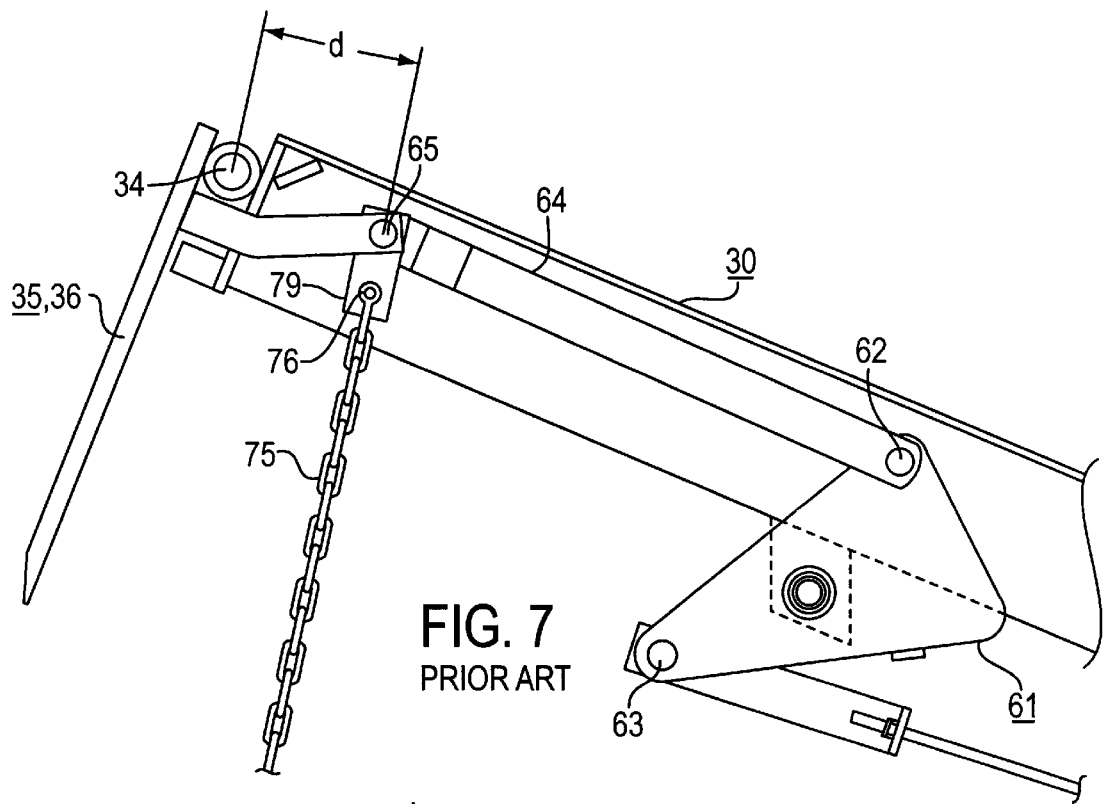
FIG. 7 is a partial side view of a conventional mechanical lip extension used on walk-down type dock levelers with the lip in the pendant position.
Figure 8:
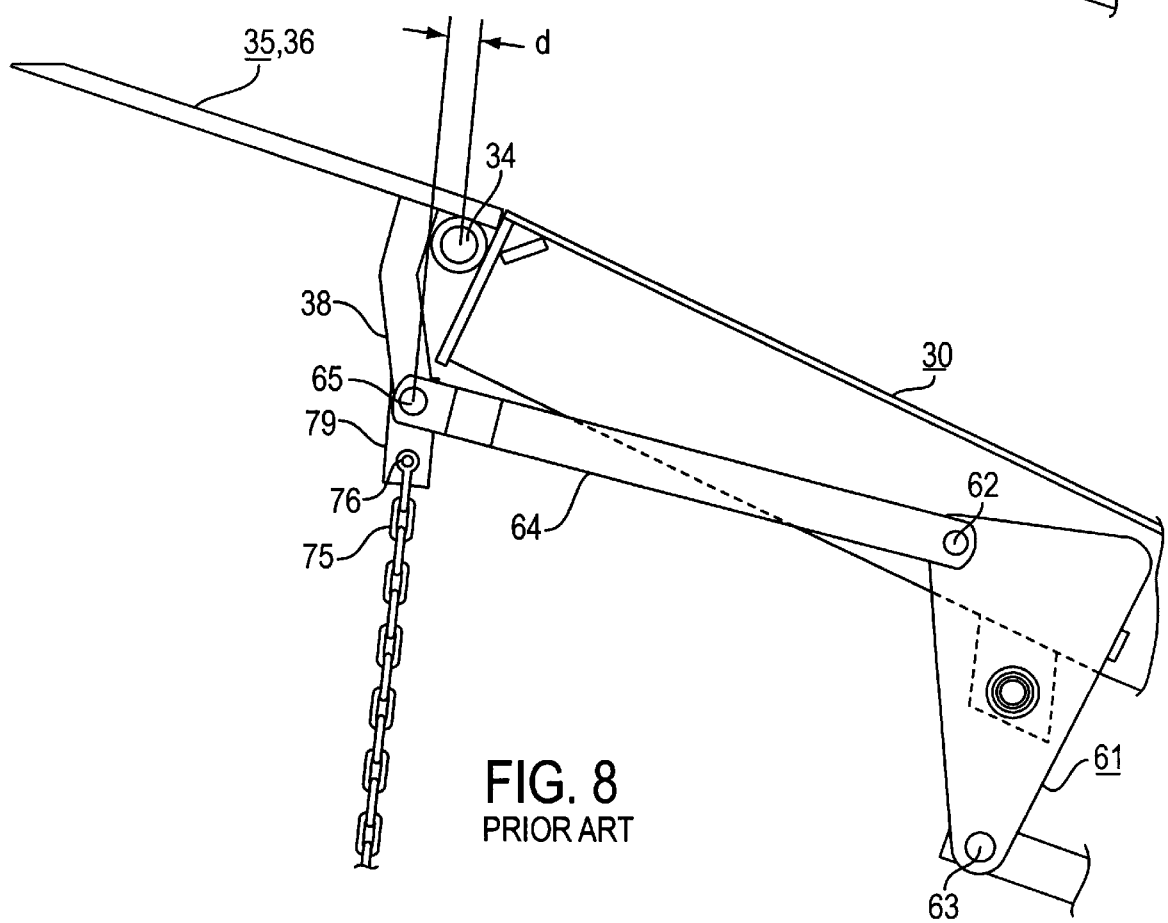
FIG. 8 is a partial side view of a conventional mechanical lip extension used on walk-down type dock levelers with the lip fully extended.

FIG. 6 illustrates the leveler fully lowered with the front bar resting on the ramp bars 24. A trip bar 26 attached to the frame member 23 has engaged the latch bar 70 and raised it out of engagement with the roller 80. This feature allows the lip to fall pendant if the leveler has been operated without a transport vehicle at the dock.

Figure 9:
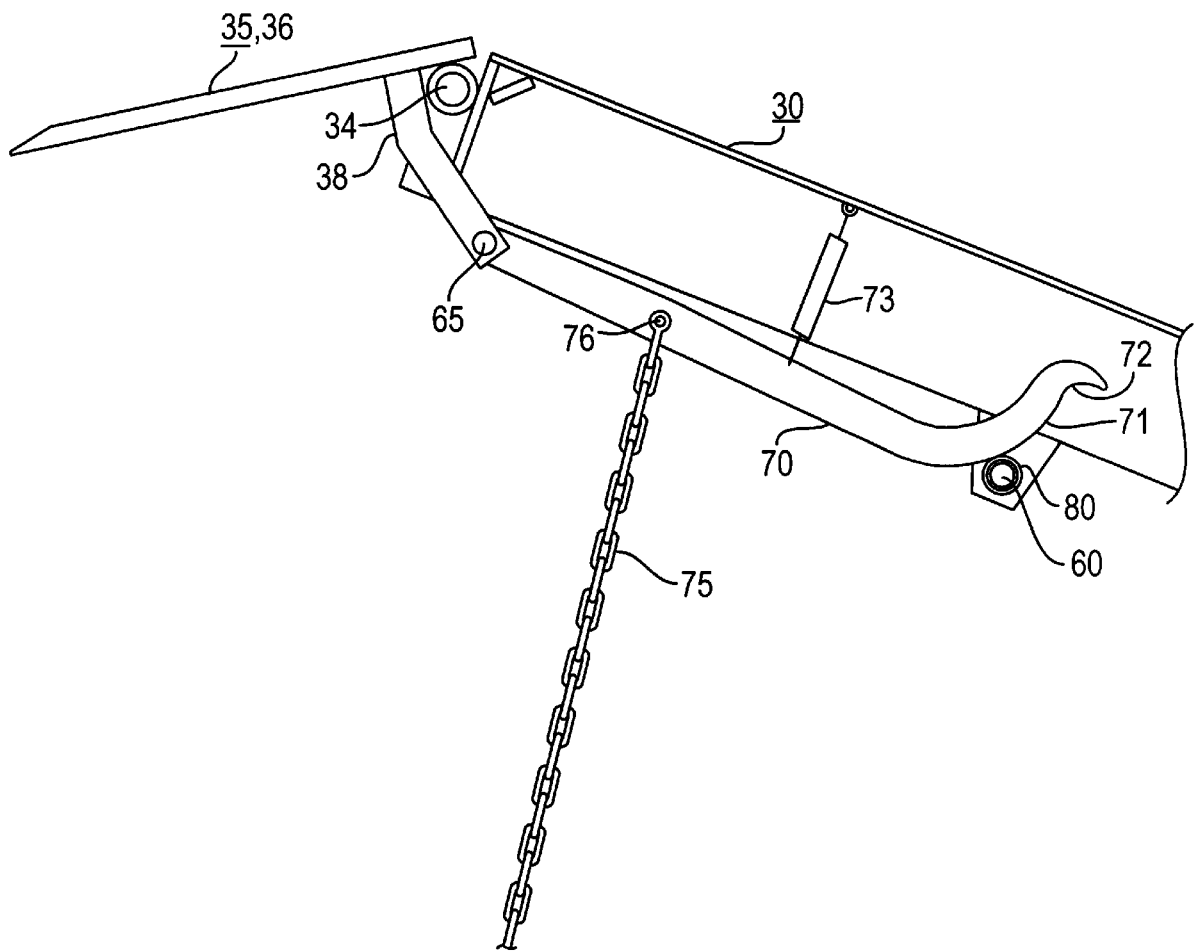
FIG. 9 is a partial side view of a second preferred embodiment of the lip extension mechanism without a spring assist mechanism.

Referring now to FIG. 9, a second preferred embodiment of this invention will be described. The dock leveler is the same as described in the first preferred embodiment except the cam-latch mechanism is independent of a spring mechanism to assist lip extension. The dock leveler may have any configuration of conventional spring assist mechanism or may be constructed without any spring assist. Obviously the force to extend the lip will be greater without a spring assist, but the operation of the cam-latch lip will be identical. Hence FIG. 9 illustrates the essential components of this invention without any other lip assist mechanism. As illustrated in FIG. 9, a shaft 60 is attached to the deck assembly 30 and carries a roller 80. A latch bar 70 is carried by pin 65 and has a curved cam surface 71 and a latch surface 72. A spring 73 is attached to the latch bar 70 and the deck assembly 30 to bias the latch bar upward. A chain assembly 75 is attached at the top end to the latch bar 70 by a pin 76. Referring now to FIGS. 3 and 9, it will be obvious that the configuration of the cam-latch is identical except that the spring assist mechanism has been removed and the spring 73 is anchored to the deck assembly 30 instead of to the lip bar 64. The operation of the lip extension is the same as described in the first embodiment.

The cam assisted lip extension mechanical assist described herein is able to provide full extension of the lip without reliance on the rotational momentum of the lip. This invention is not restricted to use with a dock leveler which is powered by an electrical actuator. It will operate with any other form of actuation such as a hydraulic cylinder, or even with a conventional mechanical dock which is spring actuated.

It is apparent that this invention may be the subject of modifications within its scope.

I claim:

1. A dock leveler comprising:

a frame and a deck pivotally mounted to said frame, an extendable lip pivotally mounted to one end of said deck, a cam-latch arm operably coupled to said lip and selectively bearing on a member attached to said deck, and a linkage between said frame and said cam-latch arm to urge said cam-latch arm into contact with said member as said deck is raised to provide a component of force to assist in raising said lip into said extended position.

2. The dock leveler of claim 1 further comprising an arm assembly coupled at one end to said lip and at another end to a crank carried by said deck to provide a force to assist in raising said lip into said extended position.

3. The dock leveler of claim 2, wherein said member includes a roller that is carried by said deck and said cam-latch arm engages said roller as said deck is raised and moves relative thereto to provide a force assisting in raising said lip.

4. The dock leveler of claim 2 wherein said member includes a roller that is carried by said deck and said cam-latch arm has a latch surface to engage said roller and support said lip when said lip is in an extended position.

5. The dock leveler of claim 3 further comprises a spring to bias said cam-latch arm toward said arm assembly and away from said roller.

6. The dock leveler of claim 1 further comprising an electric actuator to raise and lower said deck.

7. The dock leveler of claim 1 further comprising a spring coupled to said deck and to said frame to partially offset the weight of said deck to bias said deck.

8. The dock leveler of claim 2 further comprising a tension spring on a rod, mounted between said crank and said deck, said tension spring biasing said crank in one direction to urge lip toward an outward extended position.

9. The dock leveler of claim 2 wherein said cam-latch arm has one end pivotally attached to said arm assembly, a spring mounted to both said arm assembly and said cam-latch arm to carry said cam-latch arm, and wherein said linkage is coupled to said cam-latch arm at a position intermediate said one end and a cam portion proximate to the other end thereof.

10. The dock leveler of claim 1 further comprising a trip member mounted on said frame to engage said cam-latch arm when said deck is lowered to lift said cam-latch arm out of engagement with said member.

11. A dock leveler comprising:

a frame and a deck pivotally mounted to said frame, means coupled to the underside of said deck to move said deck, an extendable lip pivotally mounted to one end of said deck, a cam-latch arm coupled to said lip and selectively bearing on a member attached to said deck, and a linkage between said frame and said cam-latch arm to urge said cam-latch arm into contact with said member as said deck is raised to provide a component of force to assist in raising said lip into said extended position as said deck is raised to an elevated position.

12. The dock leveler of claim 11 further comprising an arm assembly coupled at one end to said lip and at another end to a crank carried by said deck to utilize movement of said deck to raise said lip into an extended position, wherein said member includes a roller mounted thereon and said cam-latch arm engages said roller as said deck is raised and moves relative thereto to provide a force assisting in raising said lip.

13. The dock leveler of claim 11 wherein said member includes a roller mounted thereon and said cam-latch arm has a latch surface to engage said roller and support said lip when said lip is in an extended position.

14. The dock leveler of claim 12 further comprises a spring to bias said cam-latch arm toward said arm assembly and away from said roller.

15. The dock leveler of claim 11 wherein said means to move said deck comprises an electric actuator to raise and lower said deck.

16. The dock leveler of claim 11 further comprising a spring coupling said deck to said frame to bias said deck.

17. The dock leveler of claim 12 further comprising a tension spring on a rod, mounted between said crank and said deck, said tension spring biasing said crank direction to urge lip toward an outward extended position.

18. The dock leveler of claim 12 wherein said cam-latch arm has one end pivotally attached to said arm assembly, a spring mounted to both said arm assembly and said cam-latch arm to carry said cam-latch arm, and wherein said linkage is coupled to said cam-latch arm at a position intermediate said one end and a cam portion proximate to the other end thereof.

19. The dock leveler of claim 11 further comprising a trip member mounted on said frame to engage said cam-latch arm when said deck is lowered to lift said cam-latch arm out of engagement with said roller.

20. The dock leveler of claim 19 further comprising a ramp stop mounted on said frame, said ramp stop engaging the underside of said deck to limit downward movement at a position proximate that where said trip member engages said cam-latch arm.

\* \* \* \* \*